United States Patent [19]

Miyao et al.

[11] Patent Number: 5,274,808
[45] Date of Patent: Dec. 28, 1993

[54] METHOD AND SYSTEM FOR REPLACING PROGRAM IN UNINTERRUPTIBLE COMPUTER SYSTEM

[75] Inventors: Takeshi Miyao, Hitachiota; Tomoaki Nakamura; Hiroshi Wataya, both of Katsuta; Saburou Iijima, Mito; Yasuo Sekine, Hitachi, all of Japan

[73] Assignees: Hitachi, Ltd., Tokyo; Hitachi Process Computer Engineering, Inc., Hitachi, both of Japan

[21] Appl. No.: 762,452

[22] Filed: Sep. 19, 1991

[30] Foreign Application Priority Data

Sep. 19, 1990 [JP] Japan ................. 2-247589

[51] Int. Cl.⁵ .................................. G06F 9/06
[52] U.S. Cl. ..................... 395/650; 364/DIG. 1; 364/280.8; 364/285.2; 364/261.5
[58] Field of Search .......... 395/650, 375, 725; 364/DIG. 1

[56] References Cited

U.S. PATENT DOCUMENTS

| 4,257,096 | 3/1981 | McCullough et al. | 364/DIG. 1 |
| 4,398,244 | 8/1983 | Chu et al. | 364/DIG. 1 |
| 4,425,618 | 1/1984 | Bishop et al. | 364/DIG. 1 |
| 4,704,704 | 11/1987 | Sato et al. | 364/DIG. 2 |
| 4,862,349 | 8/1989 | Foreman et al. | 364/DIG. 1 |

FOREIGN PATENT DOCUMENTS

| 584445 | 1/1983 | Japan . |
| 1232432 | 9/1989 | Japan . |

*Primary Examiner*—Thomas M. Heckler
*Attorney, Agent, or Firm*—Antonelli, Terry, Stout & Kraus

[57] ABSTRACT

A program replacing method is provided for an uninterruptible online computer system. The computer system includes an auxiliary storage unit for storing a program currently running in the computer system and another program to replace the current running program and a replacement request managing table for storing replacement requests and program IDs of such replacing programs. These programs include checkpoints pre-programmed at selected locations therein. At an optional checkpoint, the replacement request managing table is retrieved for checking whether or not the replacement is requested. If a replacement is requested, the new program is started according to the program ID and the current program is terminated.

8 Claims, 8 Drawing Sheets

F I G. 4
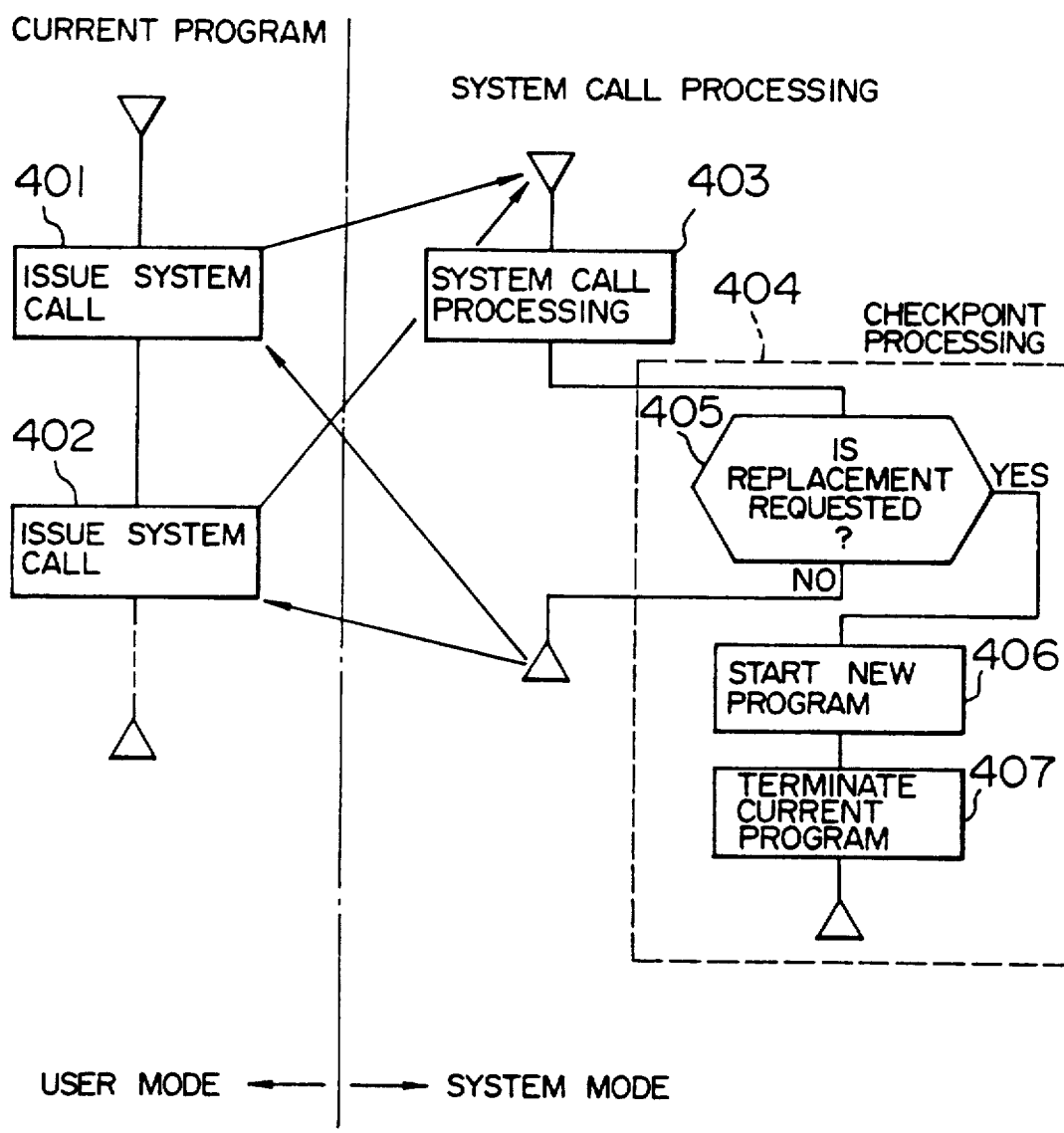

METHOD AND SYSTEM FOR REPLACING PROGRAM IN UNINTERRUPTIBLE COMPUTER SYSTEM

BACKGROUND OF THE INVENTION

The present invention relates to a method and a system for replacing a program in a computer, and more particularly to a method and a system for replacing a program running in an uninterruptible online computer system with another program.

In recent days, a remarkable need has risen for uninterruptible online computer systems used, for example, in finance-related or worldwise network systems. To replace a program in such an uninterruptible online computer system, a simple method for temporarily interrupting the computer system can be employed. This method, however, significantly degrades the online service provided by the computer system.

To overcome the shortcoming, a method has been proposed for replacing a program without interrupting an online computer as disclosed in JP-A-1-232432. This proposed method has the ability, however, to replace a current program with a new one only when starting the program. It thus has a disadvantage that the method is not intended for replacing an uninterruptible running program, because there can occur no chance or timing of starting the uninterruptible program intermediately of its online operation. Throughout this specification, a current program means a program currently running on the main storage and a new program means a program to replace the currently-running program.

Moreover, in case two or more different programs are simultaneously run which are closely related, it is necessary to replace these programs with new ones at the same time while they are in operation. However, the proposed method cannot cope with the replacement of two or more programs in operation at the same time. This is another disadvantage of the prior method.

Another method for modifying or replacing a program has been proposed in JP-A-58-4445 or U.S. Pat. No. 4,425,618.

These proposed methods consider no replacement of a program running in an online computer system. They also consider no replacement of two or more programs at the same time while they are in operation.

SUMMARY OF THE INVENTION

It is therefore a first object of the present invention to provide an improved system which is capable of replacing a program with a new one in an online computer system without interrupting its online operation.

It is a second object of the present invention to provide a method which is capable of replacing two or more programs with new ones at the same time in an online computer system.

To achieve the first object, a system according to one aspect of the invention includes an auxiliary storage unit capable of storing a current program and a new program to replace the current program, one or more check points preprogrammed in the current program, and a program replacement request managing table for storing program replacement requests and program ID numbers indicating new programs, wherein it is checked whether or not a program replacement is requested at an optional check point, and if it is requested a new program is started and the current program is terminated.

To achieve the second object, the foregoing mechanism further includes a reference counter indicating or counting the number of programs running at the same time.

A program-replacing method according to another aspect of the invention includes the steps of storing a program running in an online computer system and a new program to replace the running program in the auxiliary storage unit, preprogramming check points in the running program, retrieving a program replacement request managing table and checking at an optional check point whether or not a program replacement is requested at the check point, and if it is requested, starting the new program according to the program ID and terminating the currently running program.

According to further aspect of the above method, a method for replacing two or more programs at the same time which have run on main storage may include the steps of storing the number of the current programs running at the same time in a reference counter, decrementing the reference counter by one each time one program is stopped, and starting the new programs when the count of the reference counter is reduced to zero.

BRIEF DESCRIPTION OF THE DRAWINGS

FIG. 4 is a flowchart showing a routine for replacing a current program with a new program according to a second embodiment of the invention.

FIGS. 6, 7 and 8 are views showing a summary of the replacing operation from the current programs to a new program according to the third embodiment, in which FIG. 6 shows a state when current programs are in operation, FIG. 7 shows a state under the replacing operation, and FIG. 8 shows a state when the new programs are in operation.

DESCRIPTION OF THE PREFERRED EMBODIMENTS

Herein, the description will be directed to three embodiments of the present invention.

FIRST EMBODIMENT

Checkpoint Method

The first embodiment is of a system for replacing a program having checkpoints built within itself.

Figure 1:
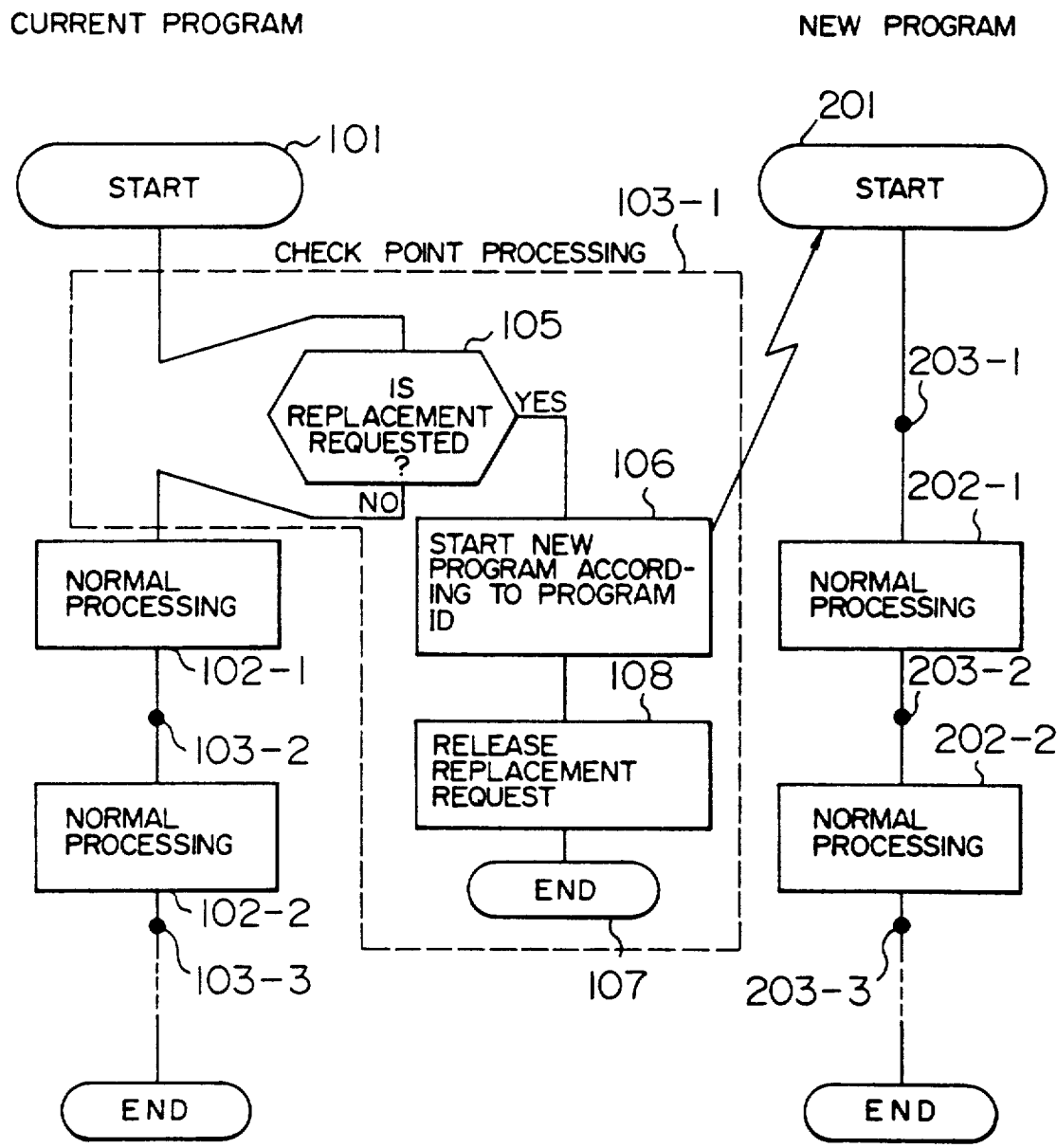
FIG. 1 is a flowchart showing a routine for replacing a current program with a new program according to a first embodiment of the invention.
Figure 2:
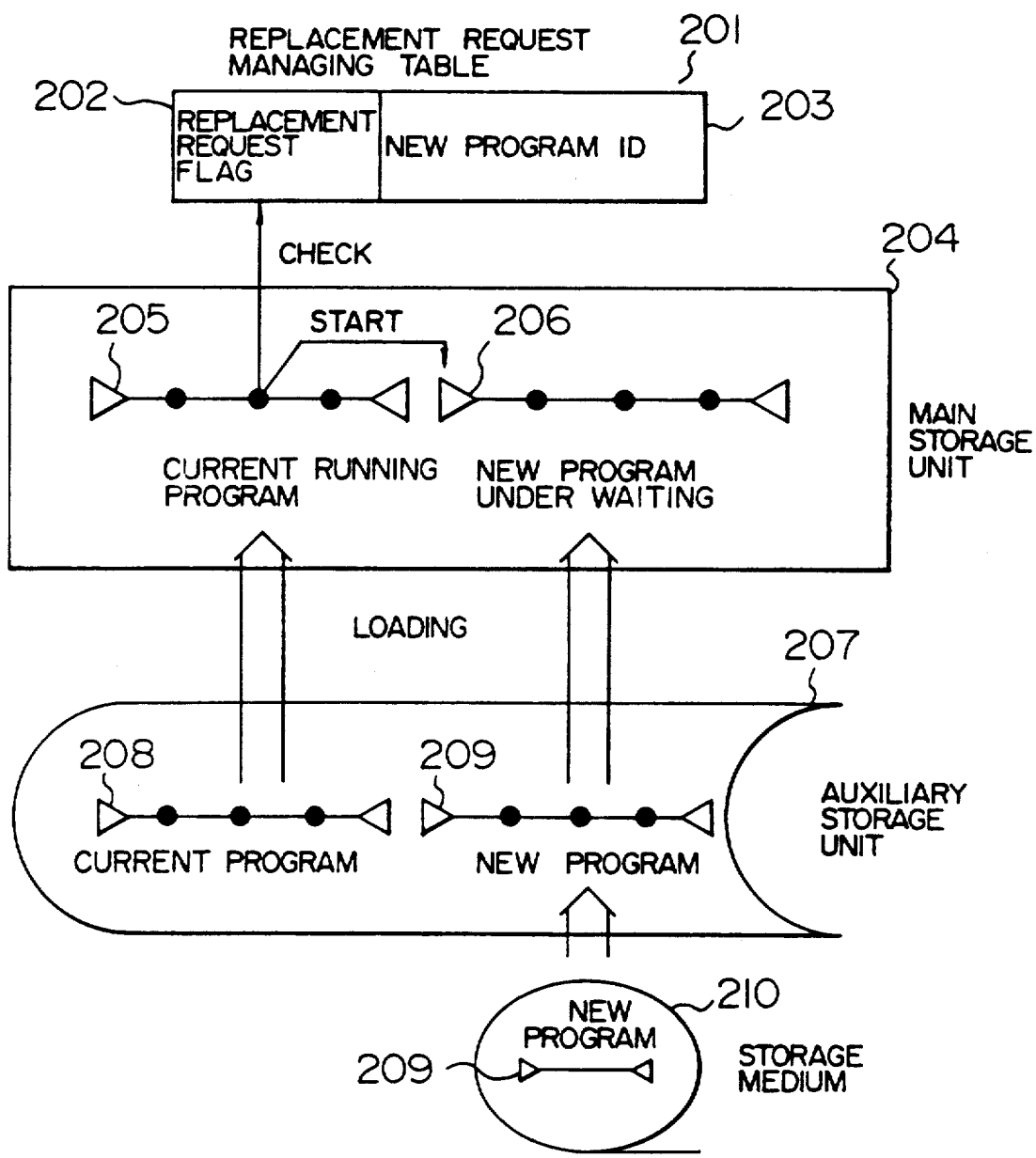
FIG. 2 is a view showing a summary of an operation for replacing a current program with a new program according to a second embodiment of the invention.
Figure 3:
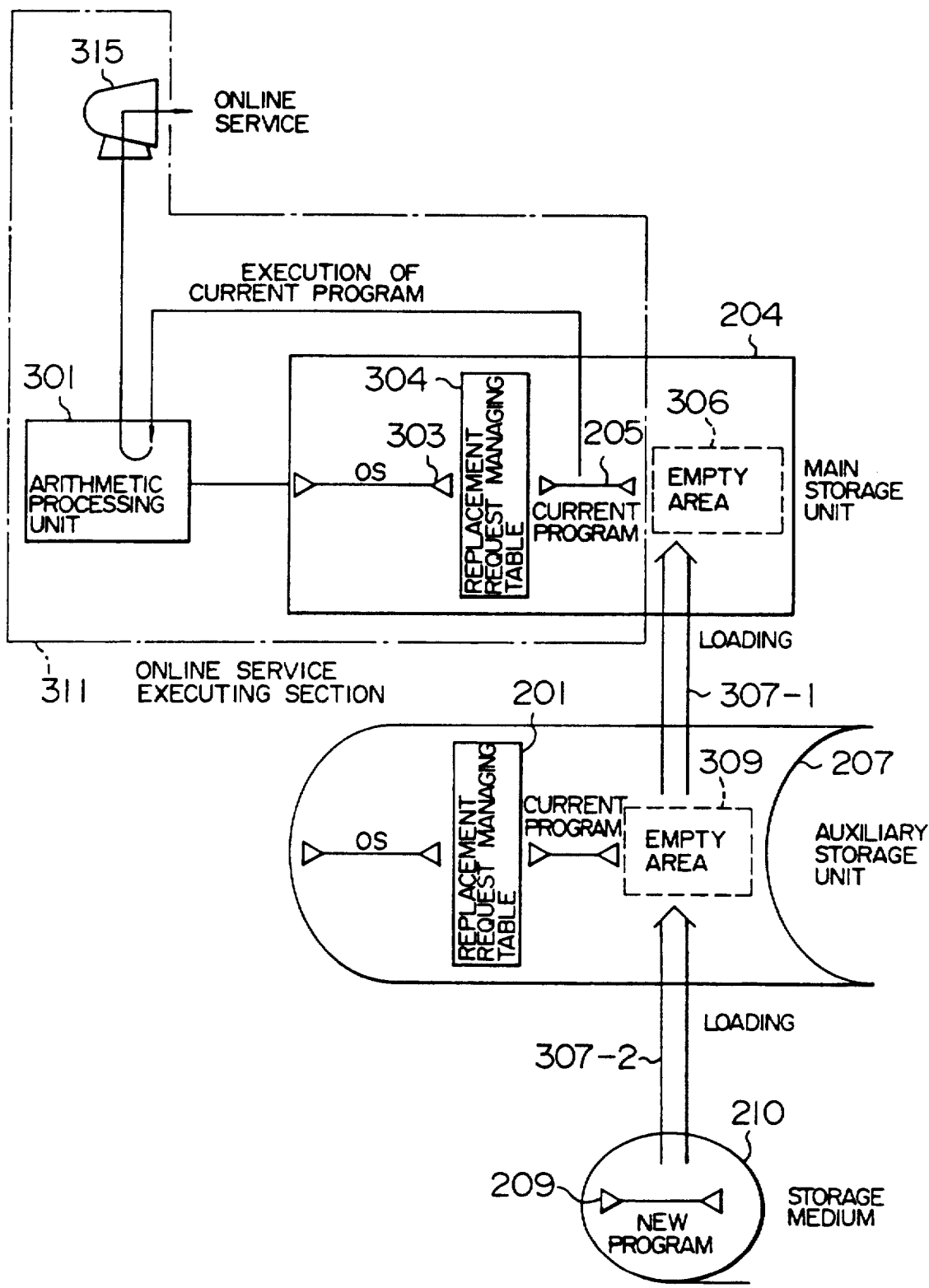
FIG. 3 is a view showing a summary of a computer system to which the first embodiment is applied.

FIG. 1 is a flowchart showing a routine for replacing a current program with a new program by using the checkpoints. FIG. 2 shows necessary components for the first embodiment and the replacing operation performed in the embodiment. FIG. 3 is a block diagram of a computer system providing an online service.

With reference to FIG. 1, the current program is started (101) and thereby the processing is started. Since several checkpoints (103) are provided at various locations in the current program, the normal processing (102) reaches the checkpoints (103) without fail. When the program reaches one checkpoint (103), the checkpoint processing (103-1) is carried out. The content of the checkpoint processing is as follows. It is checked whether or not a replacement request is issued (105). If it is not issued, the operation is returned to the current program for continuing the normal processing (102). While no replacement request is issued (replacement is not requested), the normal processing and the checkpoint processing are alternatively performed. If a replacement request is issued, the operation is transferred to a new program. The embodiment shown in FIG. 1 is arranged so that the operation is started at the head (201) of the new program. Without being limited to such arrangement, however, it is possible to start the new operation at any location in light of the processing level of the current program. The new program also has several checkpoints (203) located at suitable points.

With reference to FIGS. 2 and 3, the description will be directed to how the computer is operated in replacing a current program with a new program. At first, the new program (209) is transferred from a storage medium like a magnetic tape (210) to an auxiliary storage unit (207). Then, the new program is loaded from the auxiliary storage unit (207) to a main storage (204). As shown in FIG. 3, empty areas (309, 306) are provided for the new program in the auxiliary storage and the main storage, respectively. The loading of the new program from the storage medium (210) to the auxiliary storage (207) or from the auxiliary storage (207) to the main storage (204) is allowed to be executed outside of an online service executing section (311). That is, the loading can be executed without having to have an adverse effect to the online service. Then, a new program ID (203) is written in the replacement request managing table (201) and a replacement request flag (202) is set. The current program (208) stored in the auxiliary storage has been already loaded to the main storage, where it is in operation (205).

In this state, when the current program reaches one checkpoint and starts the checkpoint processing, since the replacement request flag has been set, the operation shown in FIG. 1 is started. That is, the new program is started (106) according to the new program ID stored in the replacement request managing table, the replacement request is released (108), and the current program is terminated (107). After the termination, the current program (205) present in the main storage is deleted.

The foregoing process makes it possible to replace the current program with the new program without having to interrupt the online service.

The first embodiment has advantages that a user program can include checkpoints at suitable locations so that a user can specify when the replacement is to be carried out.

The disadvantage entailed in the first embodiment is that, since the checkpoints have to be inserted in the programs in advance, this embodiment cannot apply to a program which may later have the checkpoints inserted therein.

SECOND EMBODIMENT

OS Processing Method

Unlike the first embodiment, the second embodiment shown in FIG. 4 is arranged for the program having no checkpoints explicitly pre-programmed therein. The current program normally issues a system call to an operating system for requesting a system service such as displaying characters on a terminal or calling a time (401, 402). When the system call is issued, the computer shifts the state to a system mode. Hence, the control is shifted from the program processing to the operating system (referred to as OS) processing. In the second embodiment, the checkpoint processing is executed under the OS processing. The OS executes the system call (403) and then the checkpoint processing (404). Like the first embodiment, the replacement request managing table is used as well. The content of the checkpoint processing is an follows. At first, it is checked whether or not the replacement request is issued (405). If it is not issued, the operation returns to the current program. If it is issued, the new program is started (406) and the current program is terminated (407).

According to the second embodiment, since the checkpoints are provided in the OS, it is not necessary to insert the checkpoints in any program. It results in making it possible to use any program for the replacement processing.

THIRD EMBODIMENT

The third embodiment is arranged so that two or more programs run on the main storage at the same time are replaced with one program stored in the auxiliary storage unit.

Figure 5:
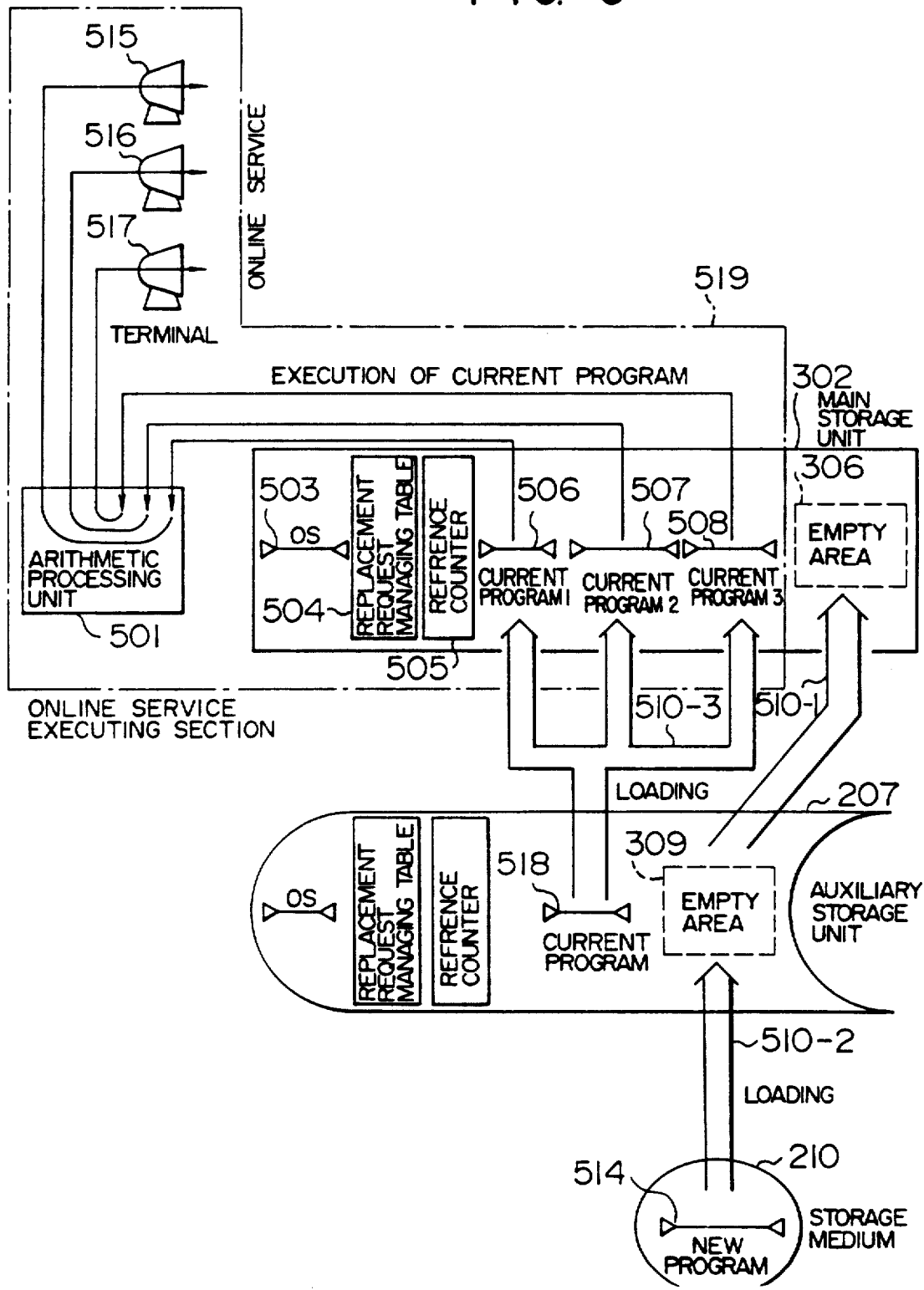
FIG. 5 is a view showing a summary of a computer system in which a replacing operation is carried out from current programs to a new program according to a third embodiment of the invention.

FIG. 5 is a system diagram showing an arrangement of the third embodiment. In the system including an arithmetic processing unit (501), a main storage unit (302), an auxiliary storage unit (207), and a plurality of terminals (515, 516, 517), the main storage unit (302) stores an OS (503), a replacement request managing table (504), a reference counter (505), and a plurality of current programs (506, 507, 508). Those programs are loaded (510-3) from just one program stored in the auxiliary storage unit (207).

Those current programs (506, 507, 508) run on the main storage unit correspond to the terminals (515, 516, 517), respectively so that those programs may provide services to the users through the terminals. On the other hand, like the first embodiment, the new program (514) is stored on the storage medium (210) and is loaded to an empty area (309) of the auxiliary storage unit (207) and then an empty area (306) of the main storage unit (302). This loading processing does not have any adverse effect on the online service.

Figure 6:
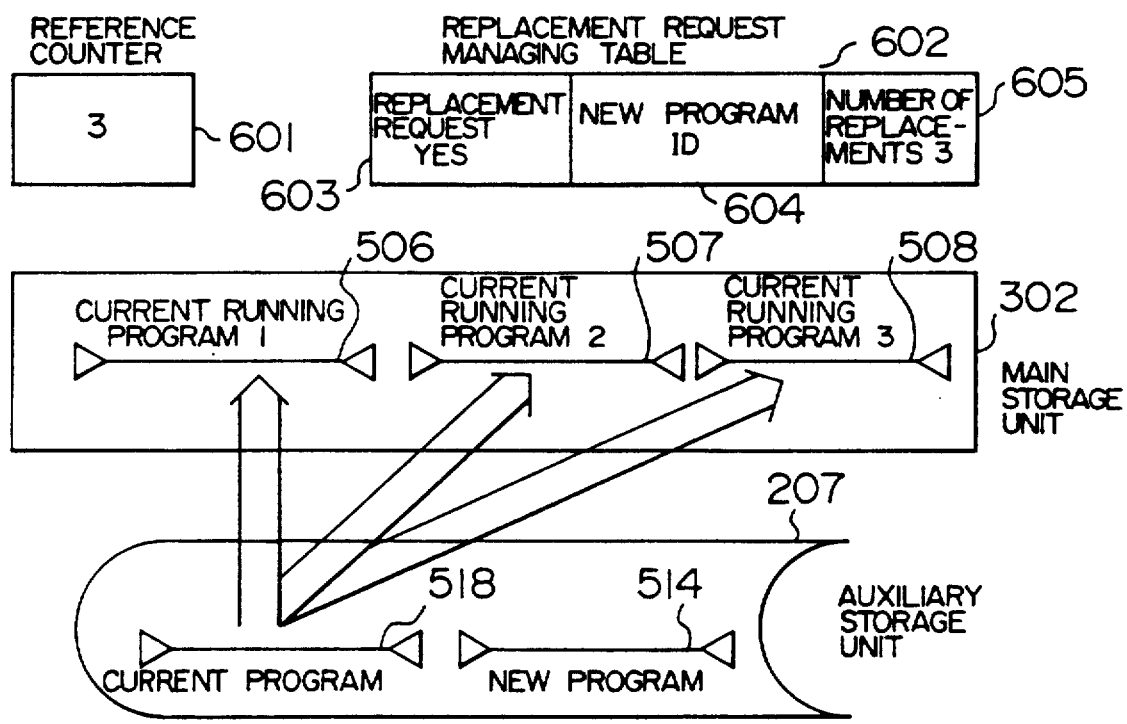

In turn, the description will be directed to the operation of the third embodiment with reference to FIG. 6. The computer system according to the third embodiment includes the main storage unit (302) having the programs 1 to 3 (506, 507, 508) run thereon, a replacement request managing table (602) containing a replacement request (603), a new program ID (604), and the number of replacements (605), and a reference counter (601). FIG. 6 shows the state when the current programs are run. The reference counter (601) is a counter which indicates the number of the current programs run on the main storage unit (302). At a time shown in FIG.

6, three current programs are run. The reference counter hence indicates 3.

Figure 7:
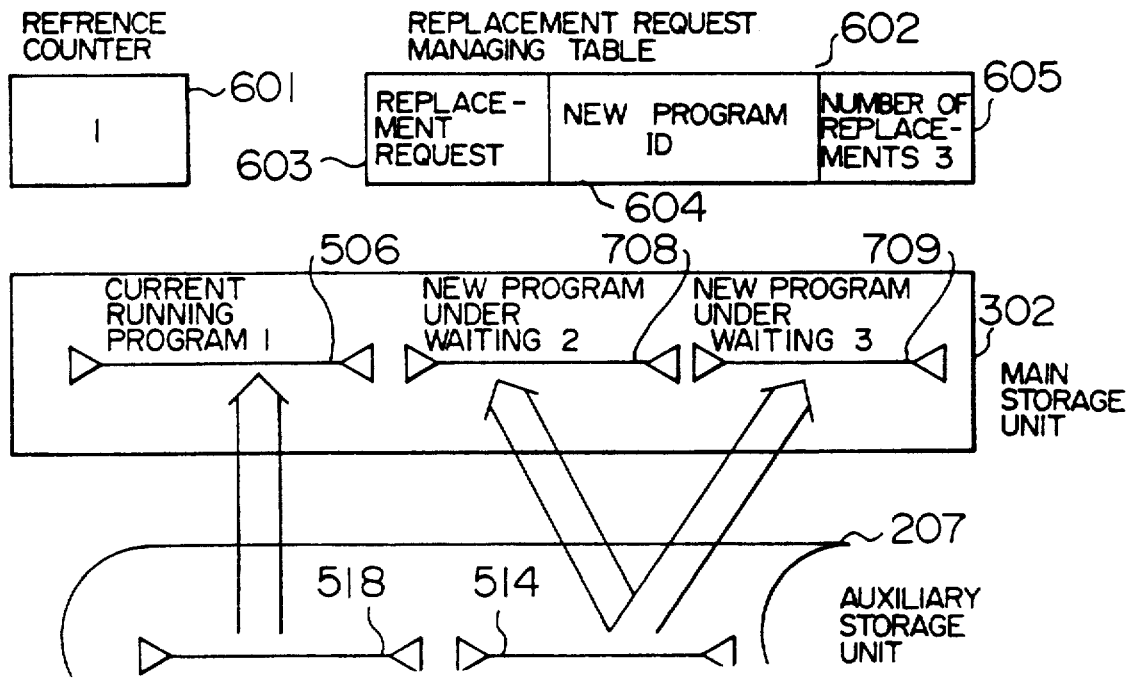

FIG. 7 shows the state which occurs during the course of replacing the programs. The current programs 2, 3, which are run in FIG. 6, have been terminated. In place, the new programs 2, 3 (708, 709) are waiting. Only the current program 1 (506) is now run. The reference counter hence indicates 1.

Figure 8:
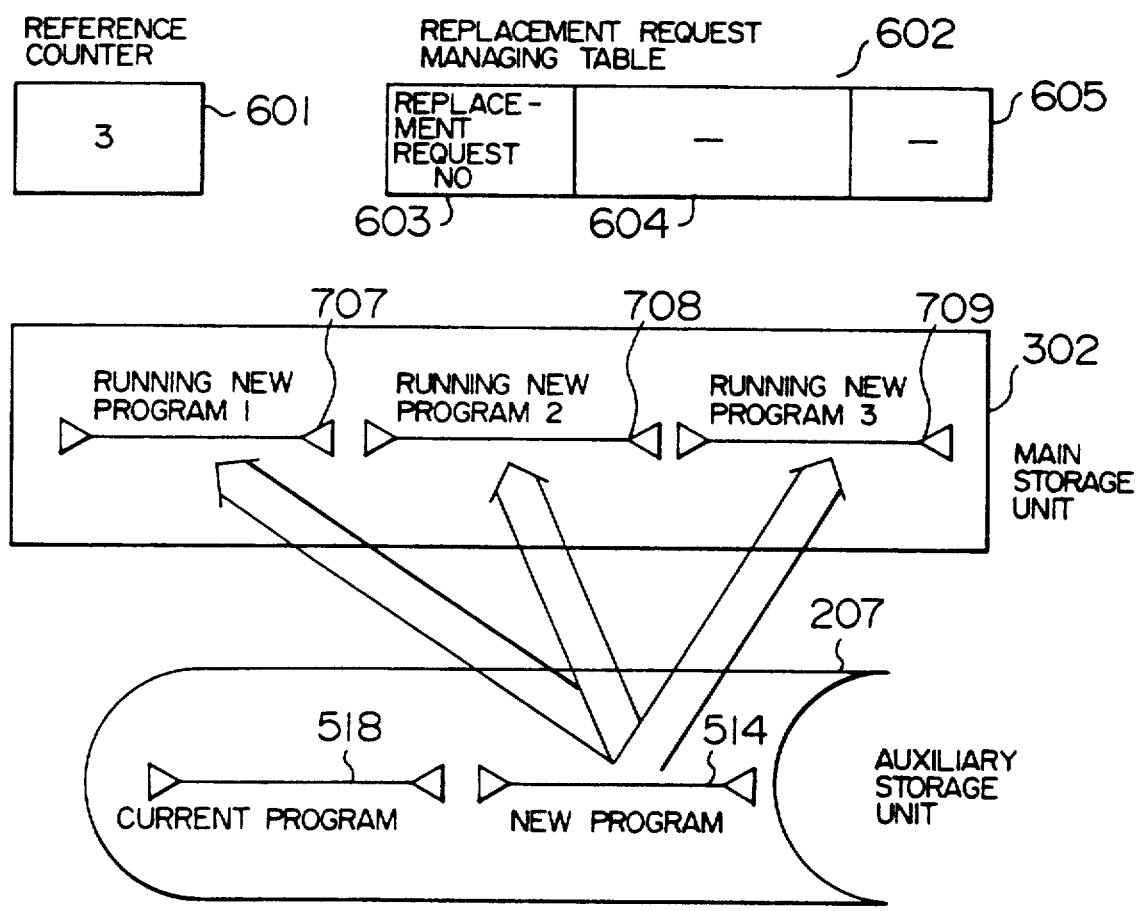

FIG. 8 shows the state when the replacement has been terminated. In this state, all the programs run on the main storage unit (302) have been replaced with the new programs (707, 708, 709). In the replacement request managing table (602), the replacement request (603), the new program ID (604), and the number of replacements (605) are all cleared. The three new programs are currently run on the main storage unit. The reference counter (601) hence indicates 3.

Figure 9:
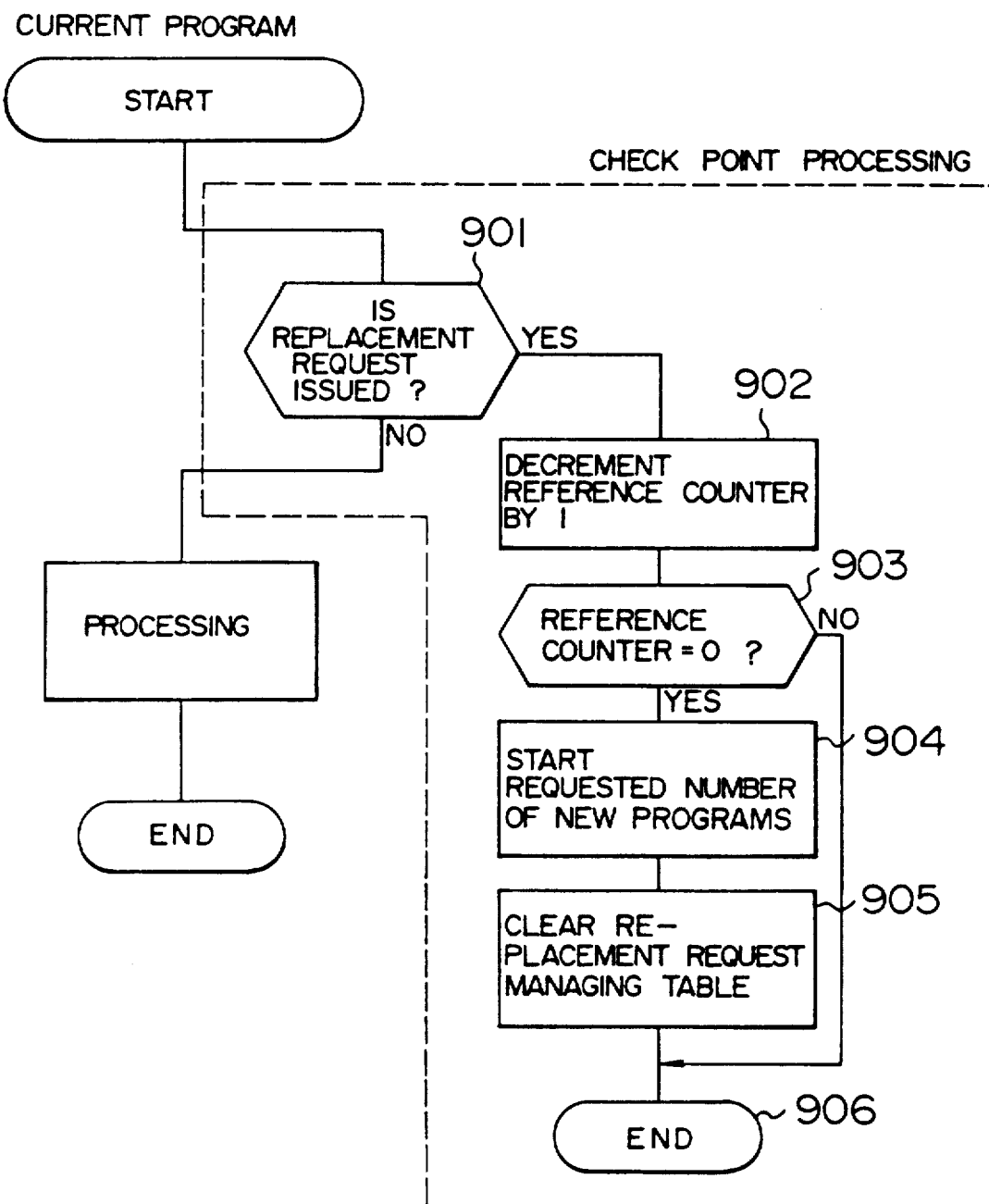
FIG. 9 is a flowchart showing a routine for replacing the current program with the new program according to the third embodiment of the invention.

FIG. 9 is a flowchart showing the checkpoint processing according to the third embodiment. At first, it is checked whether or not a replacement request is issued (901). If it is issued, the reference counter is decremented by 1 (902). Then, it is determined whether or not the reference counter indicates 0 (903). If it does not indicate 0, it means that the other current program is still run. Hence, the checkpoint processing does not start the new program and terminates by itself (906). If it indicates 0, it means that the last current program is run. Hence, the new program is started by the times required for replacement (904). Then, the replacement request managing table is cleared (905). Then, the checkpoint processing is terminated.

The foregoing operation makes it possible to replace two or more programs run on the main storage at the same time.

As is apparent from the above description, the invention has an advantage that a new uninterruptible program can be replaced with a currently-running program in the online computer system without having to interrupt the online system.

The method and system according to the invention makes it possible to replace two or more currently-running programs with new ones at the same time. It results in being able to replace a group of closely coupled programs by making it possible to replace those programs one by one.

What is claimed is:

1. A method for replacing a current program running in a computer system with a predetermined new program using a replacement request managing table storing a replacement request and a program ID of said new program by executing a check program pre-programmed in said current program, said check program comprising the steps of:
   a) referring to said replacement request managing table for checking for presence of a replacement request in said table;
   b) returning to said current program if no replacement request is found in said replacement request managing table; and
   c) starting said new program identified by said program ID if a replacement request is found in said replacement request managing table and terminating said current program.

2. A method according to claim 1, wherein said current program includes two or more check programs inserted at selected checkpoints therein.

3. A method according to claim 1, wherein said new program also includes check programs pre-programmed at selected checkpoints therein.

4. A method according to claim 1, wherein said computer system is an uninterruptible computer system.

5. A method for replacing a current user program running in a computer system with a predetermined new user program, using a replacement request managing table storing a replacement request and a program ID of said current user program, by executing a check program pre-programmed in an opening system of said computer system when a system call is issued for requesting processing by said operating system while said current user program is being executed, said check program comprising the steps of:
   a) referring to said replacement request managing table and checking for presence of a replacement request in said table;
   b) returning to said current program if no replacement request found in said replacement request managing table; and
   c) starting said new user program indicted by said program ID if a replacement request is found in said replacement request managing table and terminating said current user program.

6. A method for replacing two or more current user programs running in a computer system with a predetermined new user program, using a replacement request managing table storing a replacement request and a program ID of said current user program and a reference counter storing a number of said current user programs currently being run, by executing a check program in at least one current user program, said check program comprising the steps of:
   a) referring to said replacement request managing table for checking for presence of a replacement request in said table;
   b) returning to the current program if no replacement request is found in said replacement request managing table;
   c) decrementing the reference counter by a number corresponding to the number of running current user programs if a replacement request is found in said replacement request managing table and terminating a current user program each time said reference counter is decremented;
   d) checking whether or not the content of said reference counter has a value indicating no running current user program; and
   e) if yes is determined at the step d), starting the requested number of new user programs.

7. A computer system having a capability of replacing a current program, having one or more checkpoints pre-programmed therein, with a new program, without interrupting the operation of said computer system, comprising:
   a storage unit for storing said current program running in said computer system and a new program to replace said current program;
   means for storing a replacement request managing table for storing a replacement request and a program ID of said new program; and
   means for checking the replacement request managing table at each checkpoint of said current program to see if a replacement request is stored therein, and for starting a new program identified by said program ID and terminating said current program for replacing said current program with said new program if a replacement request is found in said replacement request managing table.

8. A computer system in which two or more current programs running in the computer system are replaced with a predetermined new user program, comprising:
- means having a replacement request managing table for storing a replacement request and a program ID of a current user program and a reference counter for storing a number of said current programs currently being run;
- means responsive to a checkpoint in a current user program for referring to said replacement request managing table for checking for presence of a replacement request in said table;
- means for returning to said current user program if no replacement request is found in said replacement request managing table;
- means for decrementing the reference counter by a number corresponding to the number of running current programs if a replacement request is found in said replacement request managing table and terminating a current user program each time said reference counter is decremented; and
- means for checking whether or not the on content of said reference counter has a value indicating no running current program and for starting the requested number of new programs if the reference counter stores a zero value.

* * * * *